United States Patent Office 3,367,376
Patented Feb. 6, 1968

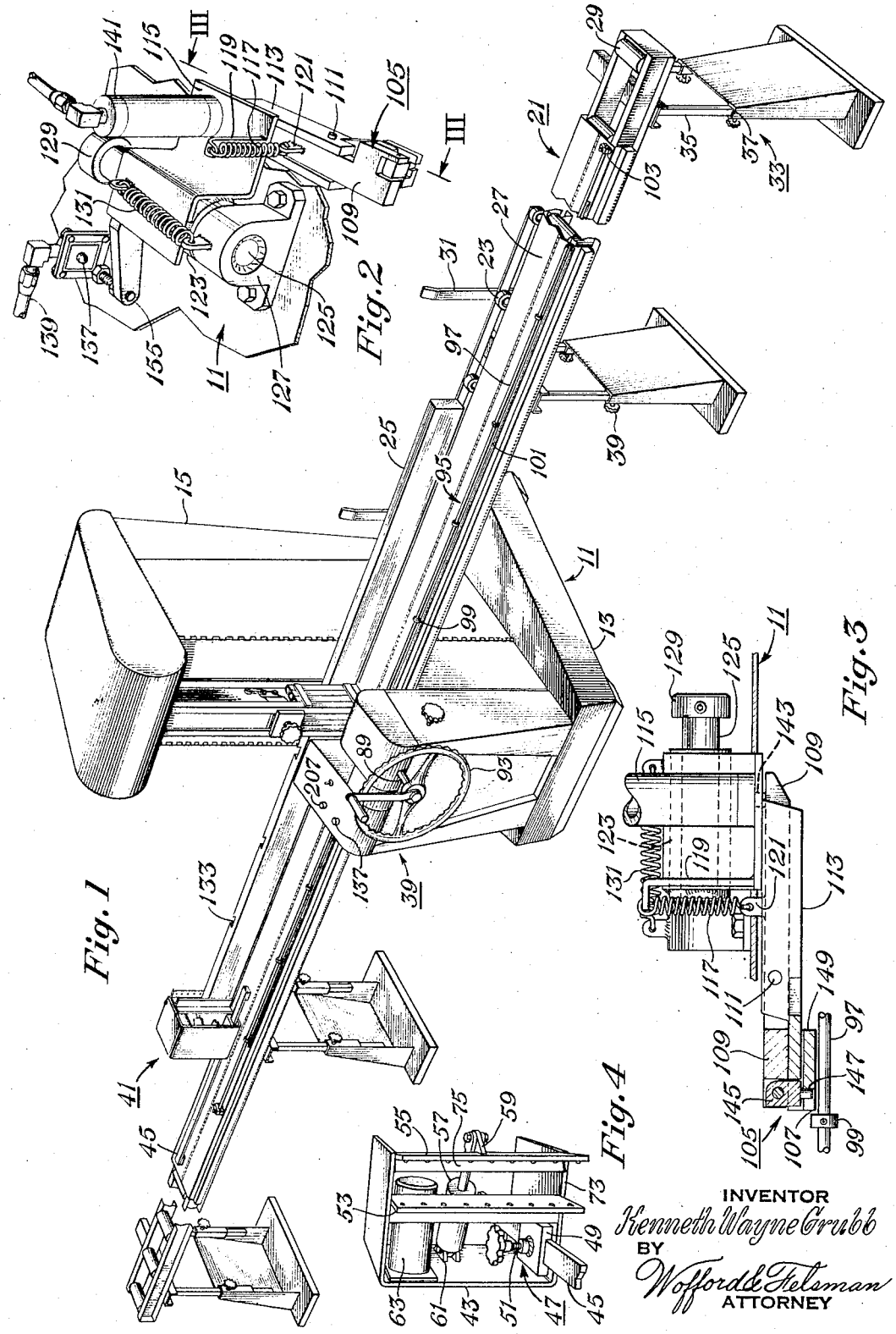

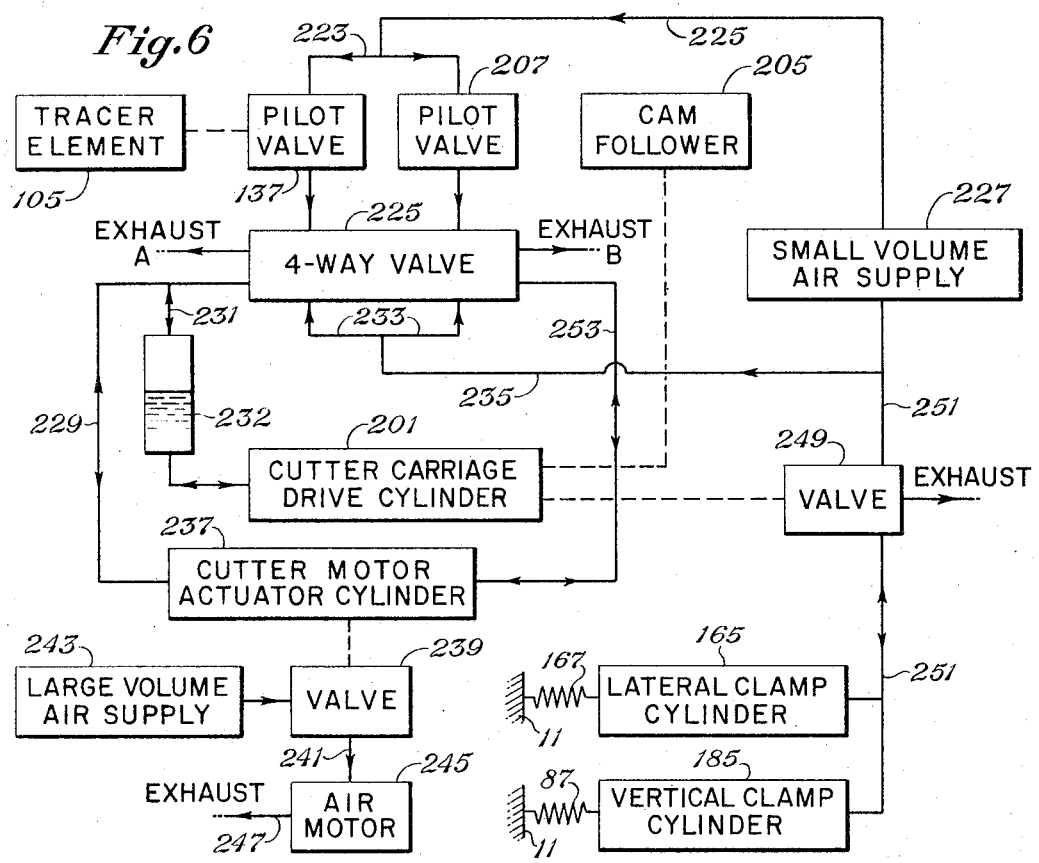
Fig.6
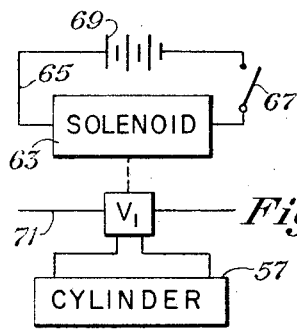
Fig.4-A
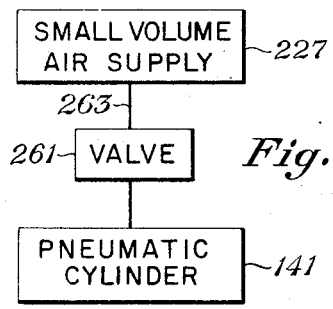
Fig.6-A
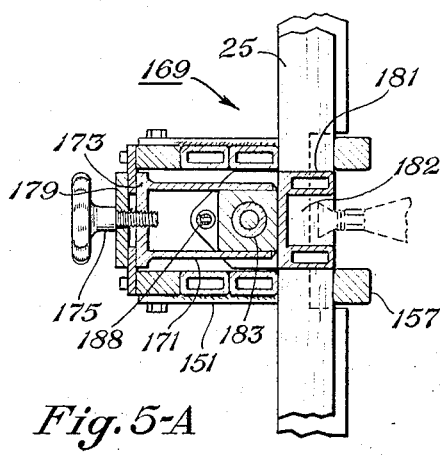
Fig.5-A

3,367,376
COMPENSATED KEY SLOT CUTTING APPARATUS AND SYSTEM
Kenneth Wayne Grubb, 229 Brown Trail, Hurst, Tex. 76053
Filed Dec. 3, 1965, Ser. No. 511,447
3 Claims. (Cl. 144—87)

My invention relates to woodworking apparatus and particularly to apparatus for the production of elongated structural wood workpieces, such as 2 x 4's, for use as components in prefabricated construction units, for example, wall panels for the construction of houses.

Previously, prefabricated construction units in the form of assembled wall panels or roof trusses made of elongated structural wood workpieces have been utilized in the building construction industry. By providing prefabricated construction units, the building process can be speeded while minimizing the amount of skilled labor required and upgrading the quality of construction.

In my U.S. Patent No. 3,082,492 there is disclosed an invention which enables the provision of greatly improved prefabricated construction units such as wall panels, roof trusses, and the like. Essential elements of these improved construction units are elongated structural wood workpieces having formed therein "compensated key slots."

My present invention derives from the need for apparatus capable of economically and effectively producing the said elongated structural wood workpieces having formed therein "compensated key slots."

It is, accordingly, the general object of my invention to provide apparatus for economically and effectively producing elongated structural wood workpieces having formed therein "compensated key slots," for use in the assembly of prefabricated construction units.

Another object of my invention is to provide in an apparatus for cutting compensated key slots in elongated wood structural member workpieces, a mechanism which enables selectivity in the angular orientation of the key slot with respect to the workpiece.

Another object of my invention is to provide improved apparatus for cutting compensated key slots in elongated wood structural member workpieces, said apparatus enabling duplication in the location and spacing of compensated key slots in a multiplicity of workpieces to enable rapid production of a quantity of identical workpieces.

These and other objects are effected by my invention as will be apparent from the following description, taken in accordance with the accompanying drawings, in which:

FIG. 1 is a perspective view of apparatus for producing elongated wood structural member workpieces having formed therein "compensated key slots," said apparatus being constructed in accordance with the principles of my invention;

FIG. 2 is a fragmentary perspective view of a tracer element and related apparatus not visible in FIG. 1;

FIG. 3 is a fragmentary cross sectional view as seen looking along the lines III—III of FIG. 2;

FIG. 4 is a fragmentary perspective view of means used to establish an initial longitudinal position of a workpiece relative to the drive means of the FIG. 1 apparatus;

Figure 5:
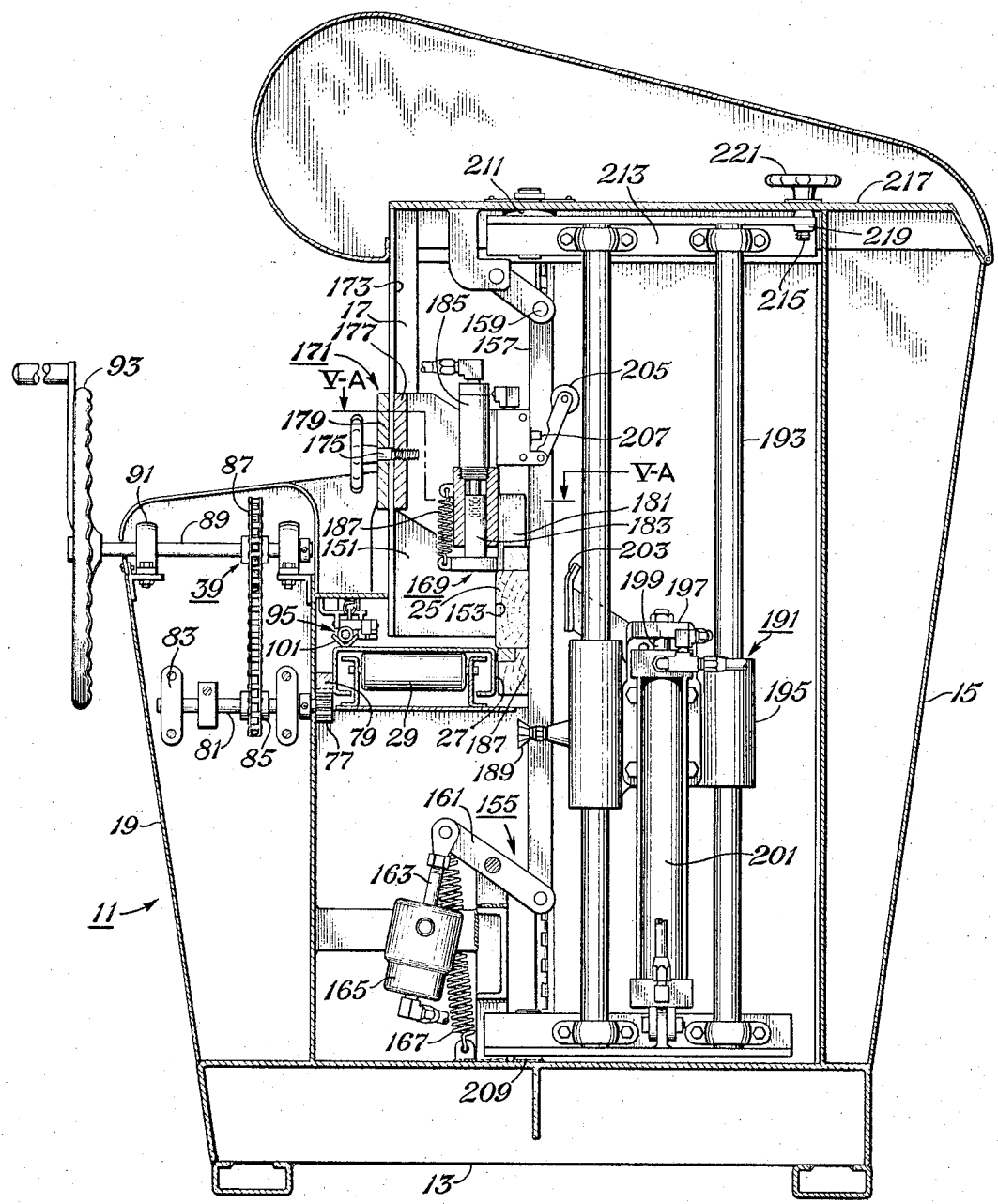

FIG. 4–A is a schematic diagram of a hydraulic and electrical system that may be used to operate the FIG. 4 device;

FIG. 5 is a side elevational view, partly in section, of the apparatus of FIG. 1;

FIG. 5–A is a fragmentary cross sectional view as seen looking along the lines V–A—V–A of FIG. 5;

FIG. 6 is a schematic diagram showing a control circuit used to operate the various mechanisms associated with my apparatus; and FIG. 6–A is another schematic diagram showing individually a control circuit used in the operation of the tracer element illustrated in FIGS. 2 and 3.

The numeral 11 in the drawing designates a support frame that includes a pedestal 13 having a vertical portion 15. The support frame 11 includes a multiplicity of rigid ribs 17 that are covered with a sheet metal skin 19.

Referring especially to FIG. 1, the frame 11 includes a horizontally disposed workpiece carrying table 21 that supports a plurality of small rollers 23 for rotation about substantially horizontal axes perpendicularly aligned with respect to the table 21. The rollers 23 are, moreover, aligned along one edge of the table to support an elongated workpiece 25 (shown here in the form of a conventional 2 x 4). Thus, the workpiece 25 may be moved to selected longitudinal positions with respect to the table 21 and with respect to the remainder of the support frame 11, such movement being facilitated by the small rollers 23.

A portion of table 21 is covered by a sheet metal band 27 that is supported by a plurality of elongated rollers 29. These rollers, like the small rollers 23, are mounted in the table 21 to rotate about substantially horizontal axes and moreover, are perpendicularly aligned with the table. Hence, the sheet metal band 27 is free to move longitudinally along the table.

A plurality of vertical guide members 31 extend upward from the table 21 and from positions rearward (as viewed in FIG. 1) of the small rollers 23 to enable easier alignment of the workpiece 25 on the rollers.

The intermediate regions and extremities of the table 21 are supported by a multiplicity of pedestal structures 33, which include vertically extending telescoping elements 35 mounted in suitable sleeves 37. Set screws 39 that include a suitable hand grip means extend through an aperture (not shown) and into engagement with telescoping elements 35 to permit adjustments in the heights thereof and thus in the angles the extremities of the table assume.

Drive means 39 are included in the apparatus so that the workpiece 25 may be moved longitudinally to selected locations. Drive means 39 includes a combination stop means and clamp 41 which engages and clamps one end portion of the workpiece 25 to establish longitudinal position of the workpiece relative to the table 21 and also to establish an initial longitudinal position of the workpiece relative to the drive means. The combination stop means and clamp 41 has in this instance a housing 43 that may be secured to a selected region of an elongated locator band 45 by a suitable clamping arrangement 47. The locator band 45 passes through a slot in a base plate 49 and a set screw 51 extends through a threaded aperture in the base plate to engage and lock the housing 43 with respect to the locator band 45. This arrangement conveniently enables selectivity in the relative position of the combination stop means and clamp 41 and the workpiece 25 with respect to the table 21 and drive means 39.

The housing 43 includes a fixed jaw 53 and a pivotable jaw 55, both of which are vertically aligned with respect to the table 21. A hydraulic cylinder 57 has its movable shaft pivotally secured to a bracket 59 on the back side of the pivotable jaw 55, with the opposite end of said cylinder being pivotally secured to a bracket 61 on housing 43. As shown in FIG. 4–A, the terminals of the solenoid 63 are connected with an electrical circuit 65 that includes a switch 67 and a suitable source of electrical power 69. Thus, upon closing switch 67 the solenoid 63 moves valve V-1 to a position to extend hydraulic cylinder 57, which is in communication with hydraulic circuit 71. Upon opening the switch 67 the solenoid 63 moves to a position to orient valve V-1 such that the hydraulic cylinder is retracted to open pivotable jaw 55. The extremity of a workpiece 25 will engage the edge 73 of housing 43 and will also engage the inner region 75 of pivotable jaw 55 to stop longitudinal movement of the workpiece 25. By closing or opening switch 67 the pivotable jaw 55 moves to a position to clamp or unclamp the end portion of the workpiece and hence an effective combination stop means and clamp is provided. The switch 67 may be spring biased and positioned such that it is automatically closed upon engagement with a workpiece, and similarly, a release switch (not shown) may be connected in parallel with switch 67 to automatically open electrical circuit 65 to release the workpiece when the sheet metal band 27 of table 21 reaches a selected position. Manual operation of switch 67 is, however, convenient, as will be seen in the operational description.

The drive means 39 further includes a pinion 77 (see FIG. 5) which engages a rack 79 secured to one edge of the sheet metal band 27. The pinion is mounted on a shaft 81 that is held in a horizontal position by suitable support means 83. Also, a toothed sprocket 85 is secured to shaft 81 and is aligned with a larger diameter toothed sprocket 87 that is secured to another shaft 89 parallel with shaft 81. Shaft 89 is also supported by suitable support means 91. Extending to the exterior of the sheet metal 19, the shaft 89 has secured to one extremity a wheel 93 that may be manually rotated to power the drive means 39 and thus to move the sheet metal band 27 of the table 21, the combination stop means and clamp 41, and the elongated workpiece 25 to selected locations. Manual operation of shaft 89 may be replaced by mechanized operation, such as by the use of an electric motor.

As may be seen in FIGS. 1 and 5, indicia means 95 are selectively positionable with respect to the workpiece 25. The indicia means in this instance is an elongated shaft 97 that has a plurality of collars 99 spaced along the length thereof. The elongated shaft and collars are carried by a suitable trough 101 and moreover are secured to the sheet metal band 27 by clamps 103. As may be seen in FIGS. 2 and 3, a tracer element 105 is adapted to slide along the top of the indicia means shaft 97, having a shoulder 107 that will engage a radial surface of a collar 99 of the indicia means. The tracer element 105 has an arm 109 that is pivotally mounted, as indicated by the numeral 111, to a V-shaped bracket 113 that depends from a support structure 115. A tension spring 117 has one end secured to a vertical post 119 on support structure 115 and its other end secured to a protrusion 121 located rearwardly from the forward shoulder 107 (as viewed in FIG. 2) of arm 109 such that the forward extremity of the arm is urged into engagement with the indicia means 95.

The support structure 115 is secured to a movable sleeve 123 that receives a shaft 125 rigidly secured to a portion of support frame 11 by a pillow block 127. Shaft 125 has, moreover, a radially extending shoulder 129 so that axial movement of sleeve 123 and thus the tracer element is not unlimited. A tension spring 131 is secured to the pillow block 127 and to support structure 115 such that the sleeve 123 is urged forward (as viewed in FIG. 2) and against the pillow block 127.

The location of the indicia means relative to the workpiece 25 may be established such that the tracer element 105 engages a collar 99 to begin a sequence of operations which forms a compensated key slot 133 (see FIG. 1), at a selected region of the workpiece. When tracer element 105 engages the collar 109 the sleeve 123 is urged rearward with respect to shaft 125 and a finger means 135, which is secured thereto, depresses a valve 137 that is connected with a pneumatic or hydraulic circuit. When the work cycle, to be described later, is completed, a pneumatic cylinder 141 that is vertically supported on support structure 115 is actuated such that its shaft 143 (see FIG. 3) depresses the rearward extremity of the arm 109 to remove its forward shoulder 107 from engagement with the collar 99. As a consequence, the drive means 39 may then be used to move the workpiece 25 to the next selected work location, which is determined by the location of the next collar 99 of the indicia means 95.

As shown in FIG. 3, the tracer element 105 may be adapted to engage forms of indicia means other than the shaft and collar arrangement shown in the drawings. For example, a finger 145 may be pivotally mounted to the arm 109 such that its lower cylindrical extremity 147 extends into a slot 148 formed in the forward rigid portion 149 of arm 109 to fall into apertures formed in a tape (not shown) secured to the workpiece carrying table 21 in place of the collar and shaft type indicia means shown in the drawings and adapted to pass through slot 148. In addition, other types of indicia means and tracer elements may be used in my apparatus and the indicia means need not necessarily be of the linear form thus far described.

Referring now to FIGS. 1 and 5, a workpiece lateral positioner member 151 is secured to support frame 11, having a vertically disposed surface 153 (see FIG. 5) that is adapted to engage one surface of the elongated workpiece 25.

A laterally movable clamp means 155 is included in the apparatus to urge the workpiece 25 against the lateral positioner member 151 to clamp the workpiece against lateral movement. Thus, after the longitudinal position of the workpiece is established by one of the previously described means, the laterally movable clamp means 155 is automatically or manually actuated as will be subsequently described.

The clamp means illustrated in FIG. 5 includes a vertically aligned clamp bar 157 which is in effect the floating link of a four bar linkage having upper and lower cranks 159, 161 that are pivotally secured to the support frame 11. Pivotally secured to an extremity of lower crank 161 is the shaft 163 of a pneumatic (or hydraulic) cylinder 165, which communicates with a suitable pneumatic circuit. When the interior of cylinder 165 is pressurized, the shaft 163 is extended such that the vertically aligned clamp bar 157 forces the elongated workpiece 25 against the workpiece lateral positioner member 151. When the pressure in the cylinder is relieved, the tension spring 167, which is connected with the support frame 11 and the crank 161, urges the shaft 163 to a retracted position thus moving the clamp bar 157 away from the workpiece 25 to enable further longitudinal movement thereof.

To further secure the workpiece 25 during the formation of compensated key cuts in the workpiece 25, a vertical clamp means 169 (see FIG. 5) is provided. This clamp means is supported in a carriage member 171 which is slidably mounted to vertical columns 173. A set screw 175 having a suitable grip means thereon extends through the carriage member 171 into engagement with a backup plate 177 that may be drawn toward or forced away from the forward plate 179 of the carriage member. This arrangement enables the carriage member 171 to be raised such that two or more workpieces may be stacked one upon the other to increase the production output of the apparatus.

Vertical clamp means 169 has a bifurcated (see especially FIG. 5-A) movable jaw 181 with a preferably wooden lower portion 182 that engages the upper edge of the workpiece. Moreover, the movable jaw is connected to a shaft 183 of a pneumatic cylinder 185. When pressure is applied to the interior of the cylinder 185 via a suitable pneumatic line, the shaft 183 is extended such that the wooden lower portion 182 of movable jaw 181 is forced downward against the workpiece. Upon releasing the pressure in the cylinder 185 a tension spring 188 that is connected with the movable jaw 181 and the carriage member 171 retracts the movable jaw 181, moving it upward and out of engagement with the workpiece. The vertical clamp means 169 also includes a stationary jaw 187 that is positioned between the small rollers 23 of the workpiece carriage table 21 and secured to support frame 11. Since both the movable and stationary jaw 181, 187 are fabricated of wood in the region in the path of the compensated key slot cutter upon the first movement of the cutter through a workpiece, key slots having dimensions identical with the slot formed in the workpiece are formed in the wooden portions of the jaws. This is advantageous in preventing a wooden workpiece 21 from splintering at its upper or lower surface upon the entry or exit of the cutter.

As may be seen in FIGS. 5 and 5-A, a compensated key slot cutter 189 is secured to a carriage 191, such cutter being adapted to rotate about its longitudinal axis and to move vertically through the apparatus a predetermined distance from the lateral workpiece positioner member 151. The carriage 191 includes two vertically aligned and spaced apart columns 193 that are surrounded by sleeves 195. These sleeves are connected with a yoke 197 which in turn is connected to the shaft 199 of a hydraulic cylinder 201. The hydraulic cylinder is connected with a suitable pneumatic or hydraulic circuit such that the cutter 189 may be selectively raised or lowered through the workpiece 25. So that the cutter 189 may be returned to its lowermost position automatically, a cam 203 is provided on the carriage 191 to engage a cam follower 205 to actuate a valve 207 in the control circuit. (An exemplary control circuit is shown in FIG. 6 and will be subsequently discussed.)

So that the angular orientation of the cutter 189 may be altered with respect to the elongated workpiece, the carriage 191 may be pivoted about an axis defined by a lower stub shaft 209 and an upper stub shaft 211. Pivotally secured to the upper and lower stub shafts are horizontal beams 213 which support the vertical columns 193. A set screw 215 extends through an arcuate aperture (not shown) in an upper plate 217 such that a setting flange 219 may be urged toward or away from a shoulder on the grip means 221. Hence, the carriage 191 and the key slot cutter 189 may be moved to selected angular orientation with respect to the workpiece, an advantageous feature, particularly when fabricating such things as construction units used in roofs.

A control circuit and system for operating the devices previously described is illustrated in FIG. 6. This circuit does not include, however, the control system used in the operation with the combination stop means and clamp 41, since this was previously described with reference to FIG. 4-A.

The previously described table tracer 105 is moved rearward upon engagement with one of the collars 99 of indicia means 95 until finger means 135 depresses the pilot valve 137 (see FIG. 2). Pilot valve 137 is in a branch 223 of a pneumatic circuit, such branch also including pilot valve 207 and a four-way valve 225. Branch 223 of the pneumatic circuit is in communication with a conduit 251 that is connected with a small volume air supply 227. The depression of pilot valve 137 actuates a shuttle valve (not shown) in the four-way valve 225 such that air is urged under pressure through the four-way valve and into conduits 229 and 231 that are in communication therewith. Simultaneously, an exhaust port A is closed so that all the air must pass through the four-way valve and into conduits 229, 231. Moreover, air is prevented from flowing through pilot valve 207 and through the four-way valve when air is flowing into conduits 21, 23 and hence, there is no air flow through conduits 233 and 235, which also communicate with the four-way valve.

Conduit 229 communicates with a cutter motor actuator cylinder 237 that is mechanically connected with a valve 239 that opens a conduit 241 to allow air to flow from the large volume air supply to an air motor 245.

A relatively large volume of air is required to rotate air motor 245 and the compensated key slot cutter 189, since large quantities of energy are required to drive the cutter 189 through the elongated workpiece 25. The air passing through motor 245 may be exhausted to the atmosphere through conduit 247. Also, the depression of pilot valve 137 actuates the cutter carriage drive cylinder 201 to cause the cutter to move upwardly and eventually through the elongated workpiece 25. Preferably, an oil-air reservoir 232 is inserted in conduit 223, and since oil will settle to the bottom of the reservoir, the cutter carriage drive cylinder become hydraulically instead of pneumatically operated. This, I have found, gives the cutter carriage smoother movements than if the cylinder is pneumatically operated.

Before the cutter 189 reaches the workpiece, the upward movement of a selected one of a movable component of the carriage 191 mechanically actuates a valve 249 that opens a conduit 251 to introduce air into the pneumatic cylinder 165 (for convenience called a lateral clamp cylinder) and into the pneumatic cylinder 185 (for convenience called a vertical clamp cylinder). The introduction of air into these cylinders urges the vertically aligned clamp bar 157 (see FIG. 5) and the movable jaw 181 of the vertical clamp means 169 (see also FIG. 5) against the workpiece. With the workpiece thus clamped, the cutter 189 proceeds transversely across and through the workpiece to form a compensated key slot in a selective region thereof.

After the formation of the compensated key slot in the workpiece, further upward movement of the cutter 189, and thus the cam 203 of the carriage 191, moves the cam follower 205 to a position to depress the pilot valve 207. This allows air to flow from the small volume air supply 227, through conduit 251 and conduit 223, through pilot valve 207 and into the four-way valve 225 to urge a shuttle valve (not shown) to a position to prevent the flow of air from the small volume of air supply into the four-way valve by way of pilot valve 137. At the same time, exhaust port A is opened to enable air to escape from conduits 229, 231 that communicate with the cutter motor actuator cylinder 237 and the cutter carriage drive cylinder 201. The exhaust port B of the four-way valve is closed and air flows through the four-way valve to a conduit 253 and to regions of the cylinders 201, 237 to urge them in opposite directions from those previously described. Therefore, the cutter 189 returns to its initial position and the air motor 245 is stopped since valve 239, in response to the retraction of the cutter motor actuator cylinder 237, is positioned to prevent the flow of air to the air motor from the large volume air supply 243.

The retraction of the cutter carriage drive cylinder 201 mechanically actuates valve 249 such that the flow of air from the small volume air supply 227 through conduit 251 is prevented. At the same time, air is permitted to flow from conduit 251 through valve 249 to exhaust to the atmosphere, thus permitting the lateral and vertical clamp cylinders 165, 185 to return to their initial positions under the influence of springs 167, 87.

The return of cutter 189 to its initial position mechanically operates a valve 261 (see FIG. 6-A) to allow air to flow through a conduit 263 to expand the shaft 143 (see FIG. 3) of pneumatic cylinder 141 to depress the rear portion and lift the front portion of arm 109 of tracer element 105. Since this removes the shoulder 107 away from engagement with the collar 99 of the indicia means, the drive means 39 may be energized to move the workpiece 25 to the next selected longitudinal position.

Pilot valves 137 and 261 may be manually operated by the actuators 137' and 261', on the console of the support frame, a feature which becomes very useful if only one workpiece must be provided with key slots in selected regions. Automatic cycling is not essential in such instances. It should be apparent that any of the valves previously described can be adapted for manual operation.

Although operational descriptions of individual components of my apparatus and system have been previously given, an overall description of the operation of the apparatus will be given to facilitate an understanding of the various features thereof.

A workpiece 25 is positioned on the workpiece carrying table 21 and is manually urged over the small rollers 23 of the table until one end engages the combination stop means and clamp 41. Drive means 39 has been previously actuated until the combination stop means and clamp 41 is disposed adjacent a surface of the vertical portion 15 of the support frame. The electrical switch 67 (shown in FIG. 4–A) is disposed on the housing 43 of the combination stop means and clamp 41 and is flipped to a closed position so that solenoid 63 orients valve V–1 to actuate the pneumatic cylinder 57 such that the movable jaw 55 (see FIG. 4) is urged toward fixed jaw 53, thus clamping securely the end of the workpiece 25.

After the workpiece has been clamped into position, it thereby assumes a selected position with respect to the sheet metal band 27 of the table 21 and also with respect to the drive means 39. With the workpiece still in position and secured, wheel 93 of the drive means may be turned to the left, thereby moving the sheet metal band 27 of the table 21 and thus the combination stop means and clamp 41 to the left as viewed in FIG. 1. Rotation of the wheel 93 and movements of the drive means 39 may be stopped at any time when it is desired to form a compensated key slot in a selected region of the workpiece 25. The indicia means 95 are utilized, however, to accurately establish the regions of the workpiece where compensated key slots are to be formed. The collar 99 on the elongated shaft 97 of indicia means 95 may be moved to and secured at selected locations along the shaft 97 and moreover, the elongated shaft may be moved longitudinally and thereafter secured in a selected location by utilization of the clamps 103. Hence, once the position of the workpiece is established with respect to the sheet metal band 27 of table 21 and drive means 39, the indicia means 95 may be selectively positioned to bear an established relationship with the workpiece.

Movement of the workpiece 25 by drive means 39 will continue if the wheel 93 is rotated to the left until the tracer element 105 or the shoulder 107 of its arm 109 senses the indicia means 95 or, in this instance, engages one of the collars 99. This forces the arm 135 of the tracer element 105 into engagement with the valve 137 to initiate rotation of the cutter 189 and upward movement of the cutter carriage 191. In other words, the indicia means and the tracer element cooperate to temporarily deactivate the drive means 39 to establish a fixed position of the workpiece, and also, signal power means to initiate their work functions. Thus, the initial upward movement of the cutter carriage 109 actuates a valve 249 (see FIG. 6) to move the lateral movable clamp means 155 and the vertical clamp means 169 into gripping engagement with the workpiece to prevent movements thereof in preparation for receiving the compensated key slot cutter 189.

After the key slot has been formed by the cutter 189, pilot valve 207 is actuated by the cooperative engagement of cam 203 with cam follower 205 and the cutter carriage 191 returns to its initial position and the air motor 245 that rotates the cutter 189 is stopped, as previously explained. Such devices as the cam 203 and cam follower 205 thus are means that operate responsive to further movements of said cutter after forming the key slot for signaling power means to return the cutter to its initial position. In addition, the valve 261 (see FIG. 6–A) is actuated such that the workpiece is released from retention by the vertical clamp means 169 and the laterally movable clamp means 155. At this stage, the valve 261 (see FIG. 6–A) is actuated such that the shoulder 107 of the arm 109 associated with the tracer element 105 is raised until it no longer engages the collar 99. This enables the wheel 89 to be rotated once again to urge the workpiece to the left as viewed in FIG. 1 once more until the next collar 99 is engaged by the tracer element 105. In effect, then, valve 261 is one component of means that operate in response to further movement of said cutter to signal the tracer element 105 to enable continued movement of the workpiece.

In this manner, a compensated key slot is formed in selected regions of the workpiece 25 at locations corresponding to the positions of the collars 99. As previously explained, other forms of indicia means, such as a metal tape with apertures formed therein, may be utilized to establish the location of the compensated key slots in the workpiece.

When the last compensated key slot is formed in the workpiece, the wheel 93 is rotated in an opposite direction to move the workpiece to the right as viewed in FIG. 1 until the combination stop clamp means 41 once again reside at a position adjacent the left side of the vertical portion 15 of the support structure 11. This moves the electrical switch 67 of FIG. 4–A into reach of the operator of the apparatus and enables movement of switch into a position to release the end of the elongated workpiece 25 from the jaws of the combination stop means and clamp 41. Another sequence of the type described above may then be performed on another elongated workpiece.

In view of the foregoing it will be apparent that I have provided apparatus which is capable of producing, economically and effectively, elongated structural wood workpieces having formed therein "compensated key slots," for use in improved prefabricated construction units such as wall panels, roof trusses, and the like, for building construction.

The foregoing disclosure and the showings made in the drawings are merely illustrative of the principles of this invention and are not to be interpreted in a limiting sense.

I claim:

1. Apparatus for cutting compensated key slots in elongated wood structural member workpieces, said apparatus comprising:
   (a) a support frame;
   (b) drive means for moving a workpiece longitudinally to selected locations relative to said support frame;
   (c) a workpiece lateral positioner member carried by said support frame;
   (d) laterally movable clamp means carried by said support frame for urging said workpiece against said lateral positioner member;
   (e) a compensated key slot cutter carried by said support frame to move transversely with respect to said workpiece a predetermined distance from said lateral workpiece positioner member; and
   (f) means carried by said support frame for establishing an initial longitudinal position of said workpiece relative to said drive means by engaging and clamping one end portion of said workpiece.

2. Apparatus for cutting compensated key slots in elongated wood structural member workpieces, said apparatus comprising:
   (a) a support frame;
   (b) drive means for moving a workpiece longitudinally to selected locations relative to said support frame;
   (c) a workpiece lateral positioner member carried by said support frame;
   (d) laterally movable clamp means carried by said support frame for urging said workpiece against said lateral positioner member.
   (e) a compensated key slot cutter carried by said support frame to move transversely with respect to said workpiece a predetermined distance from said lateral workpiece positioner member; and (f) said compensated key slot cutter being mounted to a carriage that is pivotable about an axis substantially parallel with the linear direction of travel of said cutter when moving transversely with respect to said workpiece.

3. Apparatus for cutting compensated key slots in elongated wood structural member workpieces, said apparatus comprising:
   (a) a support frame;
   (b) drive means for moving a workpiece longitudinally to selected locations relative to said support frame;
   (c) a workpiece lateral positioner member carried by said support frame;
   (d) laterally movable clamp means carried by said support frame for urging said workpiece against said lateral positioner member;
   (e) a compensated key slot cutter carried by said support frame to move transversely with respect to said workpiece a predetermined distance from said lateral workpiece positioner member;
   (f) means carried by said support frame for establishing an initial longitudinal position of said workpiece relative to said drive means by engaging and clamping one end portion of said workpiece;
   (g) indicia means carried by said support frame and being selectively positionable with respect to said workpiece;
   (h) a tracer element carried by said support frame and actuable by said indicia means; and
   (i) means operable in response to actuation of said tracer element to operate said laterally movable clamp means, to rotate said cutter, and to move said cutter transversely through said workpiece.

References Cited

UNITED STATES PATENTS

| | | | |
|---|---|---|---|
| 2,985,203 | 5/1961 | Wirth | 144—87 X |
| 3,292,677 | 12/1966 | Jeppesen | 144—133 |

DONALD R. SCHRAN, *Primary Examiner.*